US009830350B2

(12) United States Patent
Diaconu et al.

(10) Patent No.: US 9,830,350 B2
(45) Date of Patent: *Nov. 28, 2017

(54) IN-MEMORY DATABASE SYSTEM

(71) Applicant: Microsoft Technology Licensing, LLC, Redmond, WA (US)

(72) Inventors: Cristian Diaconu, Kirkland, WA (US); Craig Steven Freedman, Sammamish, WA (US); Per-Ake Larson, Redmond, WA (US); Michael James Zwilling, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/010,490

(22) Filed: Jan. 29, 2016

(65) Prior Publication Data

US 2016/0147827 A1    May 26, 2016

Related U.S. Application Data

(63) Continuation of application No. 12/756,185, filed on Apr. 8, 2010, now Pat. No. 9,251,214.

(51) Int. Cl.
*G06F 17/30* (2006.01)
*G06F 12/02* (2006.01)

(52) U.S. Cl.
CPC .... *G06F 17/30377* (2013.01); *G06F 12/0253* (2013.01); *G06F 17/30309* (2013.01);
(Continued)

(58) Field of Classification Search
CPC ............... G06F 17/30309; G06F 17/30575
(Continued)

(56) References Cited

U.S. PATENT DOCUMENTS 5,701,480 A * 12/1997 Raz ..................... G06F 9/466
714/19
6,591,272 B1 * 7/2003 Williams .......... G06F 17/30607
(Continued)

OTHER PUBLICATIONS

"Research Project: Non-blocking Memory Allocator", Retrieved From<<http://www.cse.chalmers.se/research/group/dcs/nbmalloc.html>>, Oct. 19, 2005, pp. 2
(Continued)

*Primary Examiner* — Mark E Hershley
(74) *Attorney, Agent, or Firm* — Workman Nydegger

(57) ABSTRACT

An in-memory database system includes database table stored in system memory. The database table comprises a plurality of rows including a particular row. Data corresponding to each row is stored entirely in the system memory. The database table comprises a first version of the particular row having a first valid time, and a second version having a second valid time. Index(es) are associated with the database table. Each index is implemented as a lock-free data structure and references the plurality of rows, including referencing the first and second versions of the particular row. A first transaction acting on the first version of the particular row is executed. The first version of the particular row is visible to the first transaction based on the first valid time and the second version of the particular row being not visible to the first transaction based on the second valid time.

20 Claims, 5 Drawing Sheets

(52) U.S. Cl.
CPC .. *G06F 17/30501* (2013.01); *G06F 17/30575* (2013.01); *G06F 2212/1044* (2013.01)

(58) Field of Classification Search
USPC ........................................................ 707/638
See application file for complete search history.

(56) References Cited

U.S. PATENT DOCUMENTS

| | | | | |
|---|---|---|---|---|
| 7,117,502 | B1* | 10/2006 | Harris ..................... | G06F 9/524 707/999.103 |
| 7,287,131 | B1* | 10/2007 | Martin .............. | G06F 17/30949 707/999.101 |
| 7,451,146 | B2* | 11/2008 | Boehm ..................... | G06F 9/52 |
| 7,965,290 | B1* | 6/2011 | Kouznetsov .......... | G06T 17/005 345/419 |
| 2002/0087500 | A1* | 7/2002 | Berkowitz ......... | G06F 17/30371 |
| 2002/0143743 | A1* | 10/2002 | Iyer ................... | G06F 17/30339 |
| 2002/0169784 | A1* | 11/2002 | Cha ................... | G06F 17/30327 |
| 2003/0110113 | A1* | 6/2003 | Martin ................... | G06Q 40/04 705/36 R |
| 2003/0182465 | A1* | 9/2003 | Moir ......................... | G06F 9/52 719/314 |
| 2005/0114413 | A1* | 5/2005 | Subramoney ....... | G06F 12/0269 |
| 2005/0223043 | A1* | 10/2005 | Randal .............. | G06F 17/30315 |
| 2005/0240409 | A1* | 10/2005 | Gallistel ................. | G10L 15/22 704/270 |
| 2006/0173885 | A1* | 8/2006 | Moir ........................ | G06F 9/466 |
| 2007/0169123 | A1* | 7/2007 | Hopkins ................. | G06F 9/526 718/100 |
| 2007/0198979 | A1* | 8/2007 | Dice ........................ | G06F 9/466 718/100 |
| 2008/0034166 | A1* | 2/2008 | Shavit ..................... | G06F 9/466 711/150 |
| 2008/0072236 | A1* | 3/2008 | Pope ..................... | G06F 9/4843 718/108 |
| 2008/0086480 | A1* | 4/2008 | Srivastava ......... | G06F 17/30575 |
| 2008/0215586 | A1* | 9/2008 | Pruet ................. | G06F 17/30362 |
| 2008/0250203 | A1* | 10/2008 | Schreter .................... | G06F 9/52 711/117 |
| 2008/0282057 | A1* | 11/2008 | Layden ............... | G06F 12/0223 711/210 |
| 2009/0037498 | A1* | 2/2009 | Mukherjee ............. | G06F 9/5005 |
| 2009/0055609 | A1* | 2/2009 | Kuczynski ........ | G06F 17/30312 711/162 |
| 2009/0271412 | A1* | 10/2009 | Lacapra ............ | G06F 17/30206 |
| 2010/0036890 | A1* | 2/2010 | Kawamura ......... | G06F 11/1458 707/654 |
| 2010/0185703 | A1* | 7/2010 | Ylonen ............... | G06F 12/0269 707/816 |
| 2011/0087854 | A1* | 4/2011 | Rushworth ........... | G06F 12/023 711/170 |
| 2011/0138123 | A1* | 6/2011 | Gurajada .......... | G06F 17/30595 711/118 |
| 2011/0145827 | A1* | 6/2011 | Song ........................ | G06F 7/78 718/102 |
| 2011/0154096 | A1* | 6/2011 | Matov ................. | G06F 11/1489 714/2 |

OTHER PUBLICATIONS

"Final Rejection Received for U.S. Appl. No. 12/756,185", dated Oct. 4, 2012, 28 Pages.
"Final Rejection Received for U.S. Appl. No. 12/756,185", dated Sep. 24, 2014, 32 Pages.
"Non-Final Rejection Received in U.S. Appl. No. 12/756,185", dated May 21, 2015, 31 Pages.
"Non-Final Rejection Received in U.S. Appl. No. 12/756,185", dated May 22, 2014, 29 Pages.
"Non-Final Rejection Received in U.S. Appl. No. 12/756,185", dated Mar. 23, 2012, 24 Pages.
"Notice of Allowance Received in U.S. Appl. No. 12/756,185", dated Sep. 25, 2015, 8 Pages.
Bohannon,, et al., "The Architecture of the Dali Main-Memory Storage Manager", In Multimedia Tools and Applications table of Contents, vol. 4 Issue 2, Mar. 1997, pp. 1-46.
Fraser,, et al., "Concurrent Programming without Locks", In ACM Transactions on Computer Systems, vol. 25 Issue 2, May 2007, pp. 1-61.
Garcia-Molina, et al., "Main Memory Database Systems: An Overview", In IEEE Transactions on Knowledge and Engineering, vol. 4, Issue 6, Dec. 1992, pp. 509-516.
Hendler,, et al., "A Scalable Lock-free Stack Algorithm", In Proceedings of the Sixteenth Annual ACM Symposium on Parallelism in Algorithms and Architectures, Jun. 27-30, 2004, pp. 206-215.
Herlihy, et al., "Transactional Memory: Architectural Support for Lock-Free Data Structures", In Proceedings of the 20th annual international symposium on Computer architecture (ISCA '93) Homepage, vol. 21 Issue 2, May 1993, pp. 289-300.
Michael, Maged M., "Safe Memory Reclamation for Dynamic Lock-Free Objects Using Atomic Reads and Writes", In Twenty-First ACM Symposium on Principles of Distributed Computing, Jul. 21-24, 2002, 10 Pages.
Michael, Maged M., "Hazard Pointers: Safe Memory Reclamation for Lock-Free Objects", In IEEE Transactions on Parallel and Distributed Systems, vol. 15, Issue 6, Jun. 2004, pp. 491-504.
Gidenstam, et al., "Efficient and Reliable Lock-Free Memory Reclamation Based on Reference Counting", IIEEE Transactions on Parallel and Distributed Systems, vol. 20, No. 8, Aug. 2009.
Harris, Timothy L., "A Pragmatic Implementation of Non-blocking Linked-Lists", International Symposium on Distributed Computing, 2001.

\* cited by examiner

IN-MEMORY DATABASE SYSTEM

CROSS REFERENCE TO RELATED APPLICATION

This application is a continuation of U.S. patent application Ser. No. 12/756,185, filed Apr. 8, 2010, entitled "IN-MEMORY DATABASE SYSTEM," and which issued as U.S. Pat. No. 9,251,214 on Feb. 2, 2016, the entire content of which is incorporated by reference herein in its entirety.

BACKGROUND

Many database systems include storage engines that were designed based on the assumption that data is stored on a disk and paged in and out of main memory when required for processing. As a result of the growth in main memory capacity, it may be possible to store many databases entirely in memory. Furthermore, there is a trend toward more processors (i.e., central processing unit (CPU) cores) in computer systems.

Existing in-memory storage engines are unlikely to achieve maximal performance on current and future servers (e.g., multi-core machines). Existing in-memory storage engines use one or more frequently accessed data structures and protect shared data by locks and latches. This may limit the level of concurrency and the total throughput of the system (e.g., the locks and latches may become bottlenecks).

SUMMARY

Many database systems have storage engines that were designed assuming that data would be stored on disk and frequently paged in and out of memory. Main memories are becoming large enough that many databases can be stored entirely in memory. Furthermore, there is a trend toward more processors (CPU cores) in modern computer systems, which may increase the need to efficiently scale across a large number of processors.

The present disclosure describes an in-memory database system (e.g., a database stored entirely in a main memory of a computer system) designed for modern multi-processor computer systems. The in-memory database system is designed to improve efficiency, to allow a high degree of concurrency, and to provide full transaction support for modern multi-processor computer systems. For example, the in-memory database system may avoid bottlenecks associated with commonly accessed data structures such as locks and latches. Full transaction support may include atomicity, consistency, isolation, and durability (e.g., ACID) support.

The in-memory database system disclosed herein may utilize a combination of lock-free data structures, versioning of database table rows, a non-blocking multi-version concurrency control scheme, and a non-blocking, cooperative technique for garbage collection and may execute transactions without blocking and thread switching.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
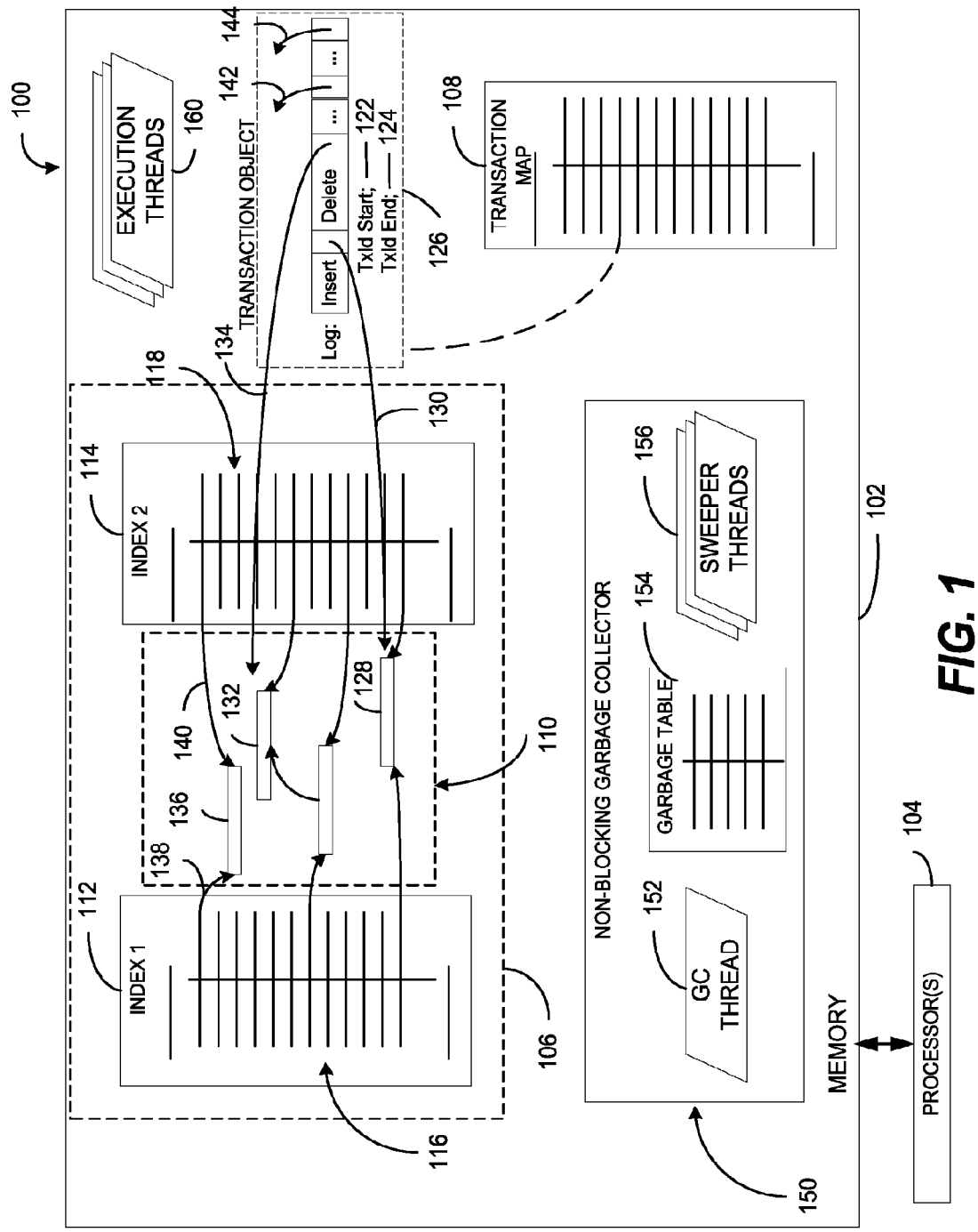
FIG. 1 is a diagram to illustrate a particular embodiment of an in-memory database system.

In a particular embodiment, a computer system is disclosed that includes a memory and a processor coupled to the memory. The processor is configured to execute instructions that cause execution of an in-memory database system that includes one or more database tables. Each database table includes a plurality of rows, where data representing each row of the plurality of rows is stored in the memory. The in-memory database system also includes a plurality of indexes associated with the one or more database tables. Each index of the plurality of indexes is implemented by a lock-free data structure. The in-memory database system further includes update logic configured to update a first version of a particular row to create a second version of the particular row. The in-memory database system also includes a non-blocking garbage collector configured to identify and deallocate data representing outdated versions of rows. These features enable the database system to execute a transaction without blocking, thereby avoiding the overhead of thread switching.

In another particular embodiment, a method includes receiving a request to execute a transaction at an in-memory database system, where the transaction is configured to update one or more rows of the in-memory database system. The method includes determining a start timestamp for the transaction and identifying a first version of the one or more rows to be updated. The method further includes updating the first version of the one or more rows to create a second version of the one or more rows at the memory. The method includes determining an end timestamp for the transaction and committing the transaction. The second version of the one or more rows is added to one or more indexes of the in-memory database system, and the first version of the one or more rows is deallocated by a non-blocking garbage collector of the in-memory database system when the first version is no longer required by any transaction.

In another particular embodiment, a computer-readable storage medium includes processor executable instructions. When executed by a processor, the instructions cause the processor to execute a non-blocking garbage collector (GC). The GC is configured to determine an oldest active transaction at an in-memory database system by finding an active transaction having an earliest start timestamp. The GC is also configured to identify one or more terminated transactions having end timestamps earlier than the start timestamp of the oldest active transaction. The GC is further configured to, for each of the identified one or more terminated transactions, determine whether the terminated transaction is committed or aborted. When the terminated transaction is committed, the GC marks old versions of rows updated by the terminated transaction as garbage. When the terminated transaction is aborted, the GC marks new versions of rows created by the terminated transaction as garbage. An execution thread that encounters a version marked as garbage may disconnect the version from one or more indexes and deallocate the version when it is no longer connected to any index. The GC is configured to track versions of rows marked as garbage that have not been deallocated from a memory. The GC is also configured to dispatch one or more sweeper threads of the in-memory database system to deallocate tracked versions of rows marked as garbage that have not been deallocated by execution threads of the in-memory database system.

Main memories for servers typically grow at a rate that exceeds the rate of growth in typical OLTP database sizes. This suggests that at some point in the future many OLTP databases may either fit entirely in main memory or a significant percentage of their working set may fit in main memory, especially if a cluster of machines is considered. At present, a 1 terabyte (TB) OLTP database may be considered large, while operating systems may support 2 TB of installed physical memory with no major impediment to extending that limit even further.

There are several consequences that may be derived from the principles enunciated above. A first consequence is that a system that has abundant main memory may have little use for a paging system. The reason for paging (or for a buffer pool) is to offer the illusion of infinite or very large memory. If the memory is large enough, use of buffer pool pages may not be necessary.

A second consequence is that, without a policy that uses buffer pool pages, there may be no reason to store undo records in a database log. Moreover, log records can be purely logical and can be grouped and written together at transaction commit time. In other words, each commit may incur a single input/output (I/O) operation that contains the redo records associated with that transaction alone. A global commit order may be sufficient to recover from the transaction log streams. It may be possible to harden these transaction log streams to different devices. Recovery may involve a merge sort of the streams from each log device. Such logical logging may simplify many areas of the system (e.g., mirroring, replication, and backup).

A third consequence is that, without a buffer pool, there may not be a reason to keep rows clustered in memory in the same page format used on disk. Rows stored on pages may cause a number of difficulties. For example, they may involve latching of full pages for access, split/merge page logic, page re-arrangement code to accommodate insertion and deletion of rows in the middle of the page, and a B-Tree (or heap) layout for search traversal. For in-memory lookup, B-Trees may not be the most efficient data structure available, so there may be a performance penalty associated with this layout. Moreover, page re-arrangement, splits and merges may lead to rows being moved around such that rows can no longer be identified and de-referenced by virtual address. As such, another level of indirection (and additional cost) may be added to reach any row. To avoid this, rows may be stored in their own memory, unrelated to any clustering unit (such as the page).

FIG. 1 depicts a particular embodiment of a computer system 100 that includes a memory 102 and one or more processors 104 configured to execute instructions that cause execution of an in-memory database system. In one embodiment, the computer system 100 is a server system that includes multiple processors 104 (e.g., multiple central processing unit (CPU) cores). The in-memory database system includes at least one database table 106, where each database table includes a plurality of rows. The in-memory database system also includes a non-blocking garbage collector (GC) 150 and a transaction map 108 stored in the memory 102. In a particular embodiment, the memory 102 includes a volatile or a non-volatile random access memory (RAM). The transaction map 108 may represent active transactions (e.g., transactions being executed by execution threads 160) at the in-memory database system. FIG. 1 illustrates a database system that may be executed entirely in the main memory 102 (e.g., in RAM) of the computer system 100. Because all data is stored in the memory 102, no data is stored on a separate hard disk and paged in and out of the memory 102. The in-memory database system of FIG. 1 may provide a high degree of concurrency and full transaction (ACID) support while efficiently scaling for modern hardware with multiple processors 104.

FIG. 1 illustrates an embodiment of an in-memory database system with a database table 106 with a plurality of rows 110, a first index 112, and a second index 114. In an alternative embodiment, the database table 106 may include any number of indexes. In another embodiment, the in-memory database system includes any number of database tables. Each index is implemented by a lock-free data structure. For example, the lock free-data structure may be implemented using a hash set, a skip list, a tree structure, or some other lock-free data structure. A hash set representing an index may include a plurality of links, where each link points to a list of rows having the same hash value. A skip list representing an index may link all rows into a single list and a row may be included in additional linked lists to enable faster search. In the embodiment illustrated in FIG. 1, the first index 112 is represented by a first lock-free data structure 116 and the second index 114 is represented by a second lock-free data structure 118.

Data representing each row of the plurality of rows 110 is stored in the memory 102. In one embodiment, the data representing each row includes a fixed-size portion of the memory 102, and the fixed-size portion of the memory 102 includes a fixed-size data structure in accordance with a row schema. In another embodiment, the data representing each row also includes a variable-size portion of the memory 102, and the fixed-size portion includes a link to the variable-size portion. The variable-size portion of the memory 102 may be located at a heap storage area of the memory 102 (see heap 212 of FIG. 2 below). In one embodiment, one data portion can point to another data portion (e.g., when the row data is large).

The execution threads 160 may execute transactions performing retrieval, insertions, updates, and deletions at the in-memory database system in accordance with a row versioning and concurrency control scheme. Each row of the database table 106 may be associated with one or more particular versions, where each particular version has a valid time. When a transaction updates a particular row, a new version of the particular row may be created. In a particular embodiment, transactions may be classified as active transactions or terminated transactions. Terminated transactions may include committed transactions and aborted transactions. Transactions may be aborted due to errors, commit dependencies, or another reason. For example, a transaction "Tx2" may read data written by another transaction "Tx1." The transaction, "Tx2" may have a commit dependency on "Tx1." If "Tx1" fails or aborts for any reason, "Tx2" is also required to abort. On the other hand, if "Tx2" terminates before "Tx1," the execution thread processing "Tx2" may move on to a new transaction, and the execution thread processing "Tx1" may complete processing of "Tx2." In this way, execution threads do not need to block but continue executing as long as there is work to be done. Non-blocking transaction execution may reduce context switches at the in-memory database system, thereby conserving resources (e.g., processor cycles).

The transaction map 108 stored in the memory 102 may be configured to track active transactions at the in-memory database system. In one embodiment, the transaction map 108 contains pointers to transaction objects similar to a transaction object 126. The transaction object 126 may include two timestamps defining the transaction's lifetime (e.g., a start timestamp 122 and an end timestamp 124) and a transaction log including a sequence of operations plus a pointer to record versions affected by the operation. An operation may be a delete of a version (e.g., an "old" version) or an insert of a version (e.g., a "new" version). In the embodiment illustrated in FIG. 1, the transaction log of transaction object 126 contains an insert operation of a version 128 (e.g., including a link 130 to data representing version 128). The transaction log also contains a delete operation of a version 132 (e.g., including a link 134 to data representing version 132). Additional operations may also be performed. For example, the transaction log of transaction object 126 may include a third database operation with respect to one of the plurality of versions 110 that includes a link 142 to the affected version. Similarly, the transaction log of transaction object 126 may include a fourth database operation with respect to one of the plurality of versions 110 that includes a link 144 to that version.

The in-memory database system may operate in accordance with a concurrency control scheme. For example, versions of rows having valid times that overlap with the transaction lifetime of a particular active transaction may be visible to the particular active transaction, but versions of rows having valid times that do not overlap with the transaction lifetime of the particular active transaction may not be visible to the particular active transaction. Thus, multiple versions of a particular row may be operated upon by the execution threads 160 at any given time. Updating a particular row may include creating a new updated version of the particular row. Reading from a particular row may include identifying an appropriate version (e.g., based on an as-of read time specified by a particular transaction or a latest version visible to a particular transaction) of the particular row.

Transaction isolation (i.e., logical stability) may be implemented at an in-memory database system via versioning. In one embodiment, all versions of a row are stored on the same lock-free data structure. Higher level isolation modes (e.g., repeatable read, serializable) may be based on plain versioning. This approach may provide the benefit of an implementation that does not penalize most users for the cost of higher isolation modes.

In a particular embodiment, cursors are used to access tables of the in-memory database system. A cursor may be a software class that abstracts database operations on the table. The cursor may implement two classes of operations (i.e., interfaces). A first class of operations may be a database search operation that includes a point lookup followed by subsequent iteration. A second class of operation may be a database modify operation (e.g., a database insert operation, a database update operation, and a database delete operation) that is position agnostic.

The garbage collector (GC) 150 may identify data representing outdated versions of rows at the in-memory database system. In a particular embodiment, a GC thread 152 identifies outdated versions of rows by determining an oldest active transaction at the in-memory database system by finding an active transaction having an earliest start timestamp. Scanning the transaction map 108 may be sufficient for obtaining the oldest active transaction in the system. Instead of a single GC thread 152, it is also possible to run multiple GC threads in parallel.

Once the oldest active transaction is determined, the GC thread 152 may identify one or more terminated transactions having end timestamps that are earlier than the start timestamp of the identified oldest active transaction. In a particular embodiment, the in-memory database system divides transactions into generations, and the GC thread 152 identifies generations of terminated transactions that are older than the identified oldest active transaction. For each of the identified terminated transactions, the GC thread 152 determines whether the terminated transaction is committed or aborted. When the terminated transaction is committed, the GC thread 152 marks old versions of rows tracked in the terminated transaction's log as garbage. When the terminated transaction is aborted (e.g., due to an error), the GC thread 152 marks new versions of rows tracked in the terminated transaction's log as garbage.

Garbage collection at the in-memory database system may be a cooperative process. The execution threads 160 may deposit completed transactions in per-CPU communication queues that may be periodically consumed by the GC thread 152. When the execution threads 160 encounter a version of a row that has been marked as garbage, the execution threads 160 may deallocate the version of the row. Besides marking versions of rows as garbage, the GC thread 152 may also maintain a garbage table 154 to track versions of rows that have been marked as garbage but that have not been deallocated by the execution threads 160. Periodically, the GC 150 may dispatch one or more sweeper threads 156 to deallocate versions of rows identified by the garbage table 154. Thus, the garbage table 154 may enable deallocation of garbage that is not encountered by the execution threads 160, thereby preventing unnecessary storage of versions no longer needed.

Figure 2:
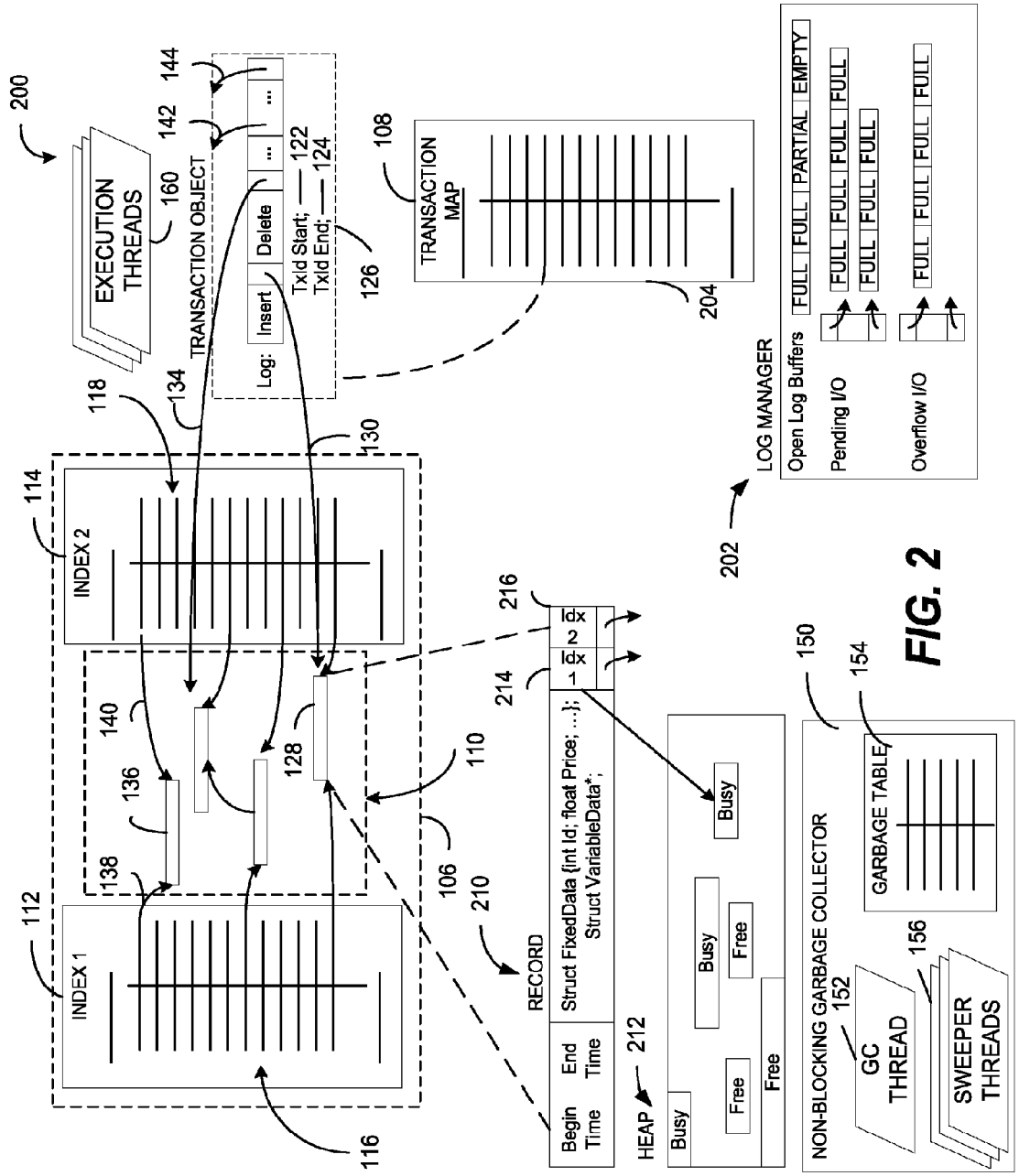
FIG. 2 is a diagram to illustrate another particular embodiment of an in-memory database system.

Referring to FIG. 2, a computer system configured to execute instructions that cause execution of an in-memory database system is illustrated at 200. Many of the elements of FIG. 2 correspond to the elements of FIG. 1. FIG. 2 illustrates further aspects of the runtime model of the present disclosure.

In FIG. 2, a sample row format of a record 210 associated with a particular row (e.g., row 128) is illustrated. The sample row format of the record 210 includes a fixed portion and a variable portion stored in a memory heap 212. The sample row format of the record 210 contains links 214 and 216 and a non-interpreted image of an end user row schema (e.g., an integer "Id" field and a floating point "Price" field).

FIG. 2 also illustrates a log manager 202 that is used by the in-memory database system to log changes to persistent storage such as disk. The log manager 202 may be responsible for allocating log buffers for committing transactions, submitting and managing multiple outstanding I/O operations to log devices, and implementing a group commit policy at the in-memory database system.

The log manager 202 may assemble multiple pages belonging to multiple transactions in a single log arena (e.g., log buffer). Each log arena may be the subject of a single asynchronous I/O to the log device submitted via a 'WriteFileGather' application programming interface (API). The log arena size (i.e., the number of pages in the arena) may be determined dynamically based on the computed throughput for the log device. The log stream may keep a history of the number of recently submitted pages. The log stream may also record the number of committed transactions that have exited the current log stream in a fixed time interval (e.g., three seconds). If the throughput of the system increases relative to the recorded history, the log stream may continue to push the arena size target in the same direction as the previous change. In other words if the arena target size was previously growing the log stream may continue to grow it, while if the arena target size was shrinking, the log stream may continue to shrink it. In one embodiment, the amount of the adjustment to the log arena size is random.

If, on the other hand, the throughput of the current log stream decreases, the log stream may change the direction of the target adjustment. For example, the log stream starts growing the target if it was previously shrinking and starts shrinking the target if it was previously growing. A local target arena size that efficiently utilizes the log device may thus be determined. Since an arena contains the log records from one or more transactions, this approach may also result in implementation of a throughput-directed group commit.

A log stream may contain two lists of buffers: one list of submitted I/Os and another list of overflow I/Os. The submitted list may be protected via locks. If a thread completing validation cannot acquire a lock to the submitted I/O list, the thread may append its buffers to the overflow list. On the other hand, threads that run under the protection of the submitted list lock may be responsible for picking up items from the overflow list and adding them to the submitted list. This approach may allow the execution threads 160 to proceed without blocking. For example, one of the execution threads 160 that can acquire the submitted I/O lock cooperatively can pick up and complete the work of other execution threads 160 that could not obtain the submitted I/O lock. Execution threads 160 unable to obtain the I/O lock may have returned to transaction processing on behalf of another user.

Figure 3:
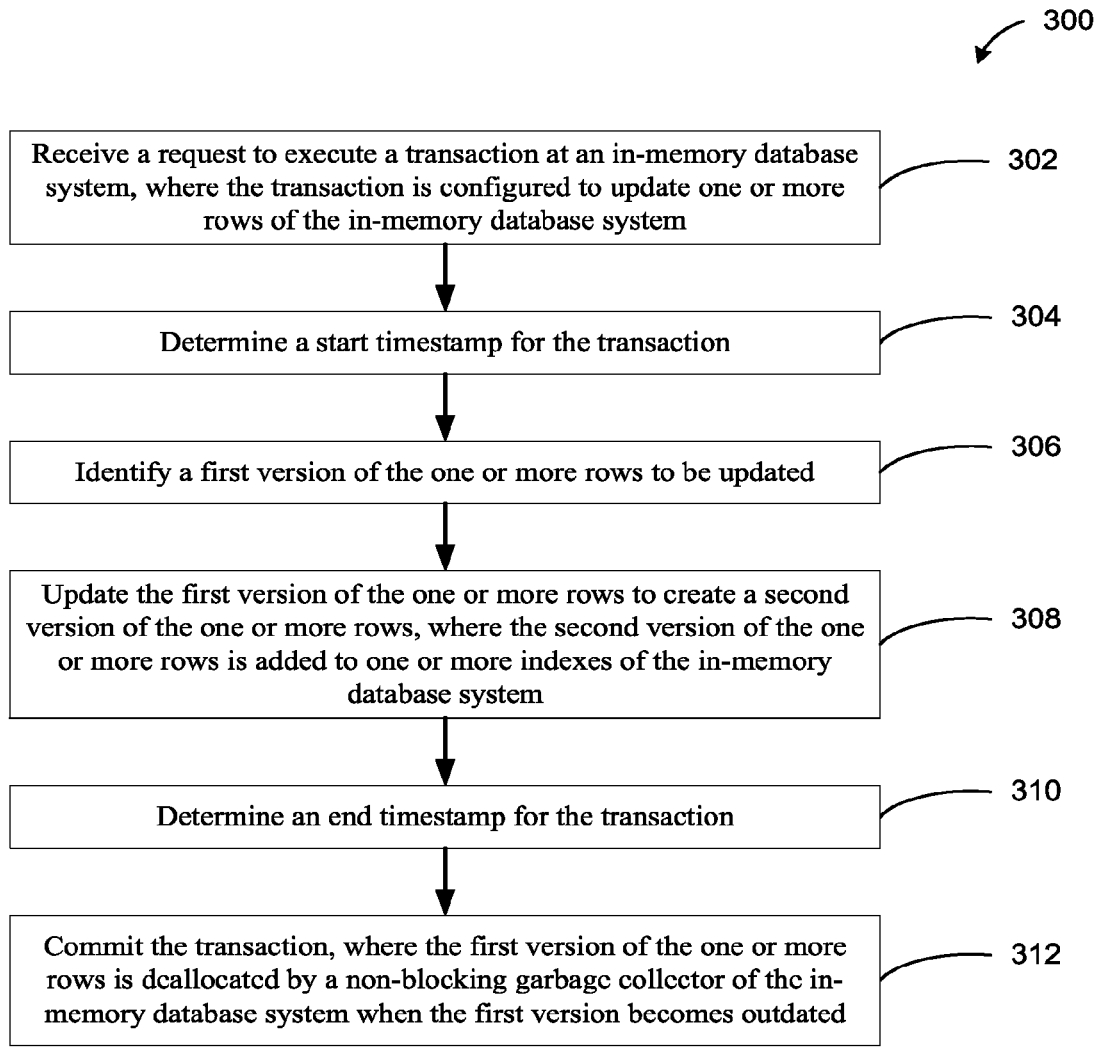
FIG. 3 is a flow diagram to illustrate a particular embodiment of executing a transaction at an in-memory database system.

FIG. 3 illustrates a method 300 of executing a transaction at an in-memory database system. A computer-readable storage medium may store instructions that, when executed by a processor, cause the processor to perform the method 300. In an illustrative embodiment, the method 300 may be performed at the system 100 of FIG. 1 or the system 200 of FIG. 2.

The method 300 includes receiving a request to execute a transaction at an in-memory database system, at 302. The transaction is configured to update one or more rows of the in-memory database system. For example, in FIG. 1, one of the execution threads 160 may receive a request to execute the transaction 126.

The method 300 also includes determining a start timestamp for the transaction, at 304. For example, in FIG. 1, the start timestamp 122 may be determined. The method 300 further includes identifying a first version of the one or more rows that are to be updated, at 306.

The method 300 includes updating the first version of the one or more rows to create a second version of the one or more rows, at 308. The second version of the one or more rows is added to one or more indexes of the in-memory database system. For example, in FIG. 1, a second version of the one or more rows may be created at the memory 102 and the second version of the one or more rows may be added to the indexes 112, 114.

The method 300 includes determining an end timestamp for the transaction, at 310, and committing the transaction, at 312. The first version of the one or more rows is later deallocated by a non-blocking garbage collector of the in-memory database system when the first version becomes outdated. For example, in FIG. 1, the end timestamp 124 may be determined, the transaction may be committed, and the GC 150 may deallocate the first version of the one or more rows when the first version becomes outdated.

It will be appreciated that the method 300 of FIG. 3 may enable transaction execution at a database system in accordance with a row versioning scheme and a concurrency control scheme. It will thus be appreciated that the method 300 of FIG. 3 may be utilized to execute multiple concurrent transactions at a database system stored entirely in memory (e.g., RAM).

Figure 4:
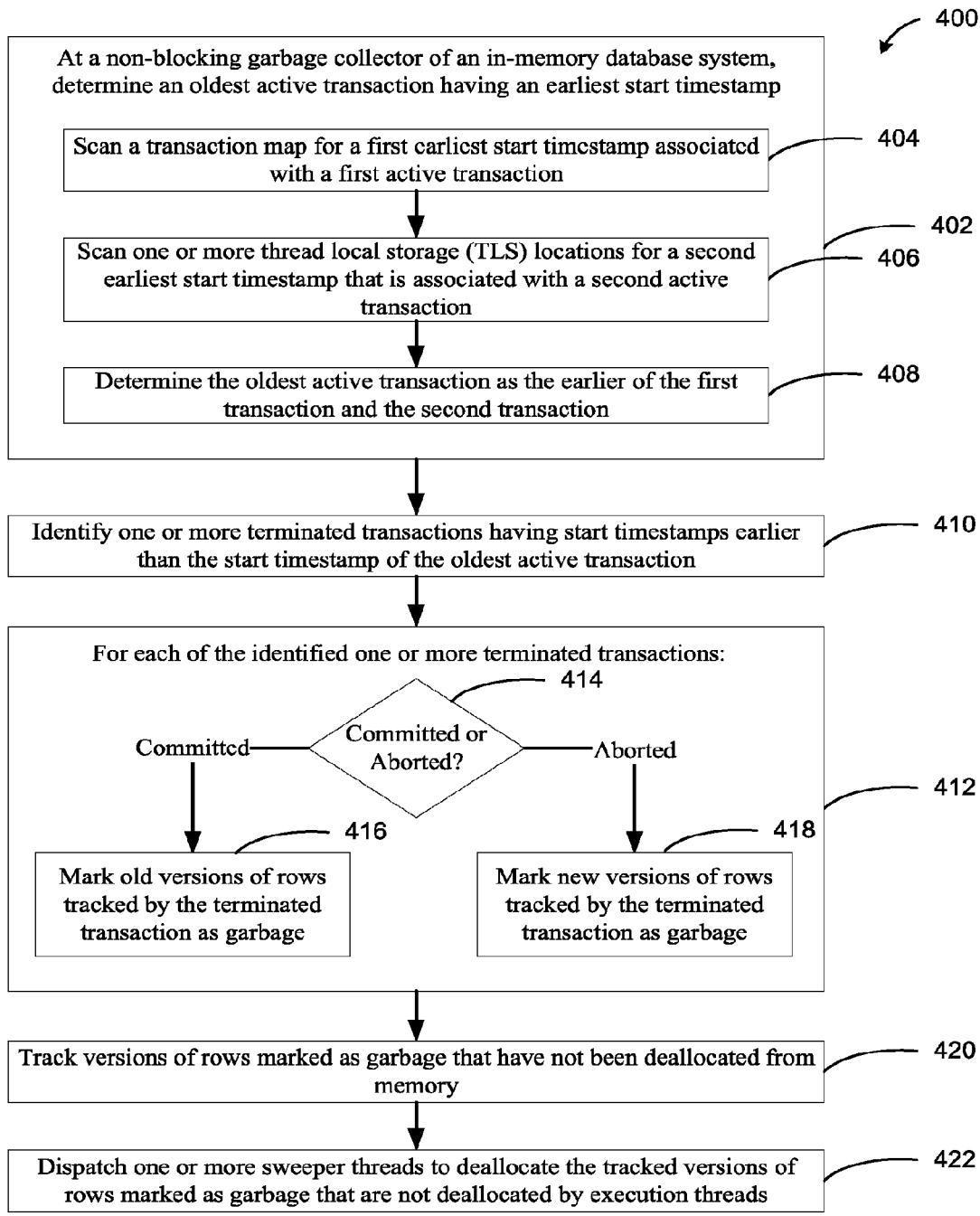
FIG. 4 is a flow diagram to illustrate a particular embodiment of a method of garbage collection at an in-memory database system.

FIG. 4 illustrates a method 400 of garbage collection at an in-memory database system. A computer-readable storage medium may store instructions that, when executed by a processor, cause the processor to perform the method 400. In an illustrative embodiment, the method 400 may be performed at the system 100 of FIG. 1 or the system 200 of FIG. 2.

The method 400 includes, at a non-blocking garbage collector of an in-memory database system, determining an oldest active transaction having an earliest timestamp, at 402. Determining the oldest active transaction includes scanning a transaction map for a first earliest timestamp associated with a first active transaction, at 404. For example, in FIG. 1, the GC thread 152 may scan the transaction map 108. Determining the oldest active transaction may also include scanning one or more thread local storage (TLS) locations for a second earliest start timestamp that is associated with a second active transaction, at 406. For example, in FIG. 1, the GC thread 152 may scan TLS locations associated with one or more of the execution threads 160. The oldest active transaction may be determined as the earlier of the first transaction and the second transaction, at 408.

The method 400 also includes identifying one or more terminated transactions having end timestamps earlier than the start timestamp of the oldest active transaction, at 410. The method 400 further includes, for each of the identified one or more terminated transactions, marking tracked versions of rows as garbage, at 412. At 414, a determination may be made as to whether each of the terminated transactions was committed or aborted. When the terminated transaction was committed, old versions of rows tracked by the terminated transaction may be marked as garbage, at 416. When the terminated transaction was aborted, new versions of rows tracked by the terminated transaction may be marked as garbage, at 418.

The method 400 includes tracking versions of rows marked as garbage that have not been deallocated from a memory, at 420. For example, in FIG. 1, the garbage table 154 may be maintained to track versions of rows marked as garbage that have not been deallocated from the memory 102. The method 400 also includes dispatching one or more sweeper threads to deallocate the tracked versions of rows marked as garbage that are not deallocated by execution threads, at 422. For example, in FIG. 1, the sweeper threads 156 may be dispatched.

It will be appreciated that the method 400 of FIG. 4 may enable cooperative non-blocking garbage collection at a database system. It will thus be appreciated that the method 400 of FIG. 4 may help prevent memory leaks at a database system stored entirely in main memory.

Figure 5:
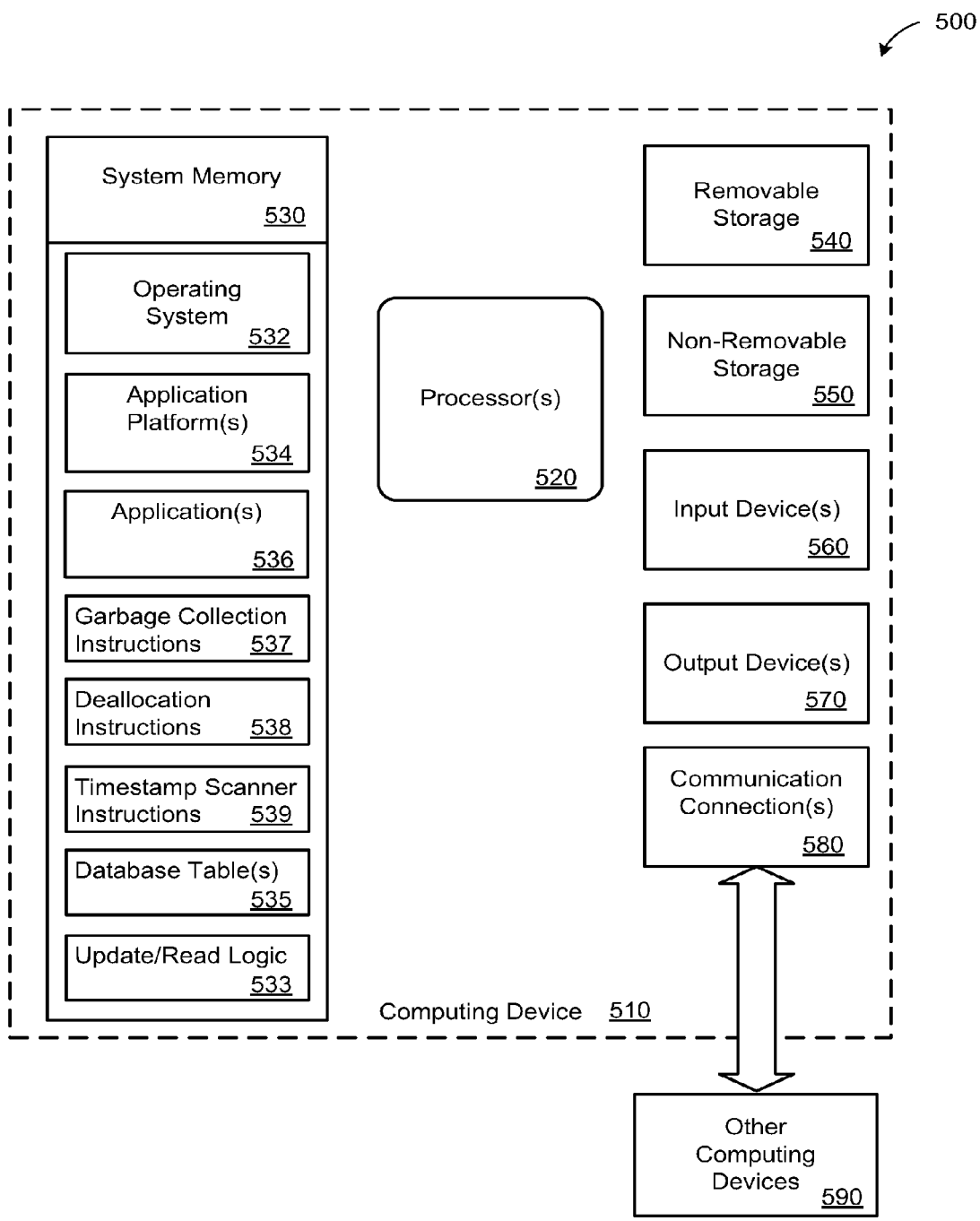
FIG. 5 is a block diagram of a computing environment including a computing device operable to support embodiments of computer-implemented methods, computer program products, and system components as illustrated in FIGS. 1-4.

FIG. 5 depicts a block diagram of a computing environment 500 including a computing device 510 operable to support embodiments of computer-implemented methods, computer program products, and system components according to the present disclosure. In an illustrative embodiment, the computing device 510 may include the system 100 of FIG. 1 or the system 200 of FIG. 2.

The computing device 510 includes at least one processor 520 and a system memory 530. For example, the system memory 530 may include the memory 102 of FIG. 1. Depending on the configuration and type of computing device, the system memory 530 may be volatile (such as random access memory or "RAM"), non-volatile (such as read-only memory or "ROM," flash memory, and similar memory devices that maintain stored data even when power is not provided), or some combination of the two. The system memory 530 typically includes an operating system 532, one or more application platforms 534, one or more applications 536, and other program instructions. For example, the system memory 530 includes one or more database tables 535. The one or more database tables 535 may include the database table 106 of FIG. 1 and FIG. 2.

The system memory 530 may also include garbage collection instructions 537, deallocation instructions 538, and timestamp scanner instructions 539. For example, the garbage collection instructions 537 and the timestamp scanner instructions 539 may be associated with execution of the GC thread 152 of FIG. 1 and FIG. 2 (e.g., to determine an oldest active transaction). As another example, the deallocation instructions 538 may be associated with execution of the one or more sweeper threads 156 of FIG. 1 and FIG. 2. The system memory 530 may further include update and read logic 533. The update and read logic 533 may be configured to update a first version of a particular row to create a second version of the particular row and to read data from a particular row by identifying an appropriate version of the particular row.

The computing device 510 may also have additional features or functionality. For example, the computing device 510 may also include removable and/or non-removable additional data storage devices such as magnetic disks, optical disks, tape, and standard-sized or flash memory cards. Such additional storage is illustrated in FIG. 5 by removable storage 540 and non-removable storage 550. Computer storage media may include volatile and/or non-volatile storage and removable and/or non-removable media implemented in any technology for storage of information such as computer-readable instructions, data structures, program components or other data. The system memory 530, the removable storage 540 and the non-removable storage 550 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 510. Any such computer storage media may be part of the computing device 510.

The computing device 510 may also have input device(s) 560, such as a keyboard, mouse, pen, voice input device, touch input device, etc. Output device(s) 570, such as a display, speakers, printer, etc. may also be included. The computing device 510 also contains one or more communication connections 580 that allow the computing device 510 to communicate with other computing devices 590 over a wired or a wireless network.

It will be appreciated that not all of the components or devices illustrated in FIG. 5 or otherwise described in the previous paragraphs are necessary to support embodiments as herein described. For example, the removable storage 540 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer system, comprising:
one or more processors;
a main memory; and
one or more computer-readable media having stored thereon computer-executable instructions that are executable by the one or more processors to manage an in-memory database system that operates on a database that is also stored entirely in the main memory of the computer system, the computer-executable instructions including instructions that are executable to configure the computer system to perform at least the following:
execute the database system entirely within the main memory of the computer system such that paging data of the database system between main memory and a disk is avoided during execution of the database system, execution of the database system including at least:
storing the entirety of a database that is being operated on by the database system within the main memory of the computer system, the database including a table comprising a plurality of rows including a particular row, data corresponding to each row being stored entirely in the main memory, the database table comprising a first version of the particular row having a first valid time and a second version of the particular row having a second valid time;
associating one or more indexes with the database table, each index being implemented as a lock-free data structure and referencing the plurality of rows, including referencing the first version of the particular row and the second version of the particular row; and
executing a first transaction acting on the first version of the particular row, the first version of the particular row being visible to the first transaction based at least on the first valid time and the second version of the particular row being not visible to the first transaction based at least on the second valid time.

2. The computer system of claim 1, wherein the first version of the particular row is visible to the first transaction based at least on the first valid time overlapping a transaction lifetime of the first transaction, and the second version of the particular row is not visible to the first transaction based at least on the second valid time not overlapping the transaction lifetime of the first transaction.

3. The computer system of claim 1, the computer-executable instructions including also instructions that are executable to configure the computer system to execute a second transaction acting on the second version of the particular row, the second version of the particular row being visible to the second transaction based at least on the second valid time and the first version of the particular row being not visible to the second transaction based at least on the first valid time.

4. The computer system of claim 3, wherein the second version of the particular row is visible to the second transaction based at least on the second valid time overlapping a transaction lifetime of the second transaction, and the first version of the particular row is not visible to the second transaction based at least on the first valid time not overlapping the transaction lifetime of the second transaction.

5. The computer system of claim 1, wherein the one or more indexes are stored in the main memory of the computer system.

6. The computer system of claim 1, wherein the one or more indexes comprise one or more of a hash set, a skip list, and a tree structure.

7. The computer system of claim 1, the computer-executable instructions including also instructions that are executable to configure the computer system to store a record of a plurality of transactions, including the first transaction, in a transaction map.

8. The computer system of claim 1, the computer-executable instructions including also instructions that are executable to configure the computer system to execute a garbage collection process that marks rows as garbage.

9. The computer system of claim 1, wherein the garbage collection process marks old versions of rows tracked in a committed transaction's log as garbage and marks new versions of rows tracked in an aborted transaction's log as garbage.

10. The computer system of claim 1, the computer-executable instructions including also instructions that are executable to configure the computer system to persist log changes associated with the database table to a durable storage medium.

11. The computer system of claim 1, wherein the database system operates in accordance with a concurrency control scheme.

12. A method, implemented at a computer system, that includes one or more processors and a main memory, for managing an in-memory database system that operates on a database that is also stored entirely in the main memory of the computer system, the method comprising:
executing the database system entirely within the main memory of the computer system such that paging data of the database system between main memory and disk is avoided during execution of the database system, execution of the database system including at least:
storing the entirety of a database that is being operated on by the database system within the main memory of the computer system, the database including a table comprising a plurality of rows including a particular row, data corresponding to each row being stored entirely in the main memory, the database table comprising a first version of the particular row having a first valid time and a second version of the particular row having a second valid time;
associating one or more indexes with the database table, each index being implemented as a lock-free data structure and referencing the plurality of rows, including referencing the first version of the particular row and the second version of the particular row; and
executing a first transaction acting on the first version of the particular row, the first version of the particular row being visible to the first transaction based at least on the first valid time and the second version of the particular row being not visible to the first transaction based at least on the second valid time.

13. The method of claim 12, wherein the first version of the particular row is visible to the first transaction based at least on the first valid time overlapping a transaction lifetime of the first transaction, and the second version of the particular row is not visible to the first transaction based at least on the second valid time not overlapping the transaction lifetime of the first transaction.

14. The method of claim 12, further comprising executing a second transaction acting on the second version of the particular row, the second version of the particular row being visible to the second transaction based at least on the second valid time and the first version of the particular row being not visible to the second transaction based at least on the first valid time.

15. The method of claim 14, wherein the second version of the particular row is visible to the second transaction based at least on the second valid time overlapping a transaction lifetime of the second transaction, and the first version of the particular row is not visible to the second transaction based at least on the first valid time not overlapping the transaction lifetime of the second transaction.

16. The method of claim 12, wherein the one or more indexes are stored in the main memory of the computer system.

17. The method of claim 12, wherein the one or more indexes comprise one or more of a hash set, a skip list, and a tree structure.

18. The method of claim 12, further comprising storing a record of a plurality of transactions, including the first transaction, in a transaction map.

19. The method of claim 12, further comprising executing a garbage collection process that marks rows as garbage.

20. A computer program product comprising one or more hardware storage devices having stored thereon computer-executable instructions that are executable by one or more processors of a computer system to manage an in-memory database system that operates on a database that is also stored entirely in a main memory of the computer system, the computer-executable instructions including instructions that are executable to configure the computer system to perform at least the following:

execute the database system entirely within the main memory of the computer system such that paging data of the database system between main memory and a disk is avoided during execution of the database system, execution of the database system including at least:

storing the entirety of a database that is being operated on by the database system within the main memory of the computer system, the database including a table comprising a plurality of rows including a particular row, data corresponding to each row being stored entirely in the main memory, the database table comprising a first version of the particular row having a first valid time and a second version of the particular row having a second valid time;

associating one or more indexes with the database table, each index being implemented as a lock-free data structure and referencing the plurality of rows, including referencing the first version of the particular row and the second version of the particular row; and executing a first transaction acting on the first version of the particular row, the first version of the particular row being visible to the first transaction based at least on the first valid time and the second version of the particular row being not visible to the first transaction based at least on the second valid time.

* * * * *